Figure 1:
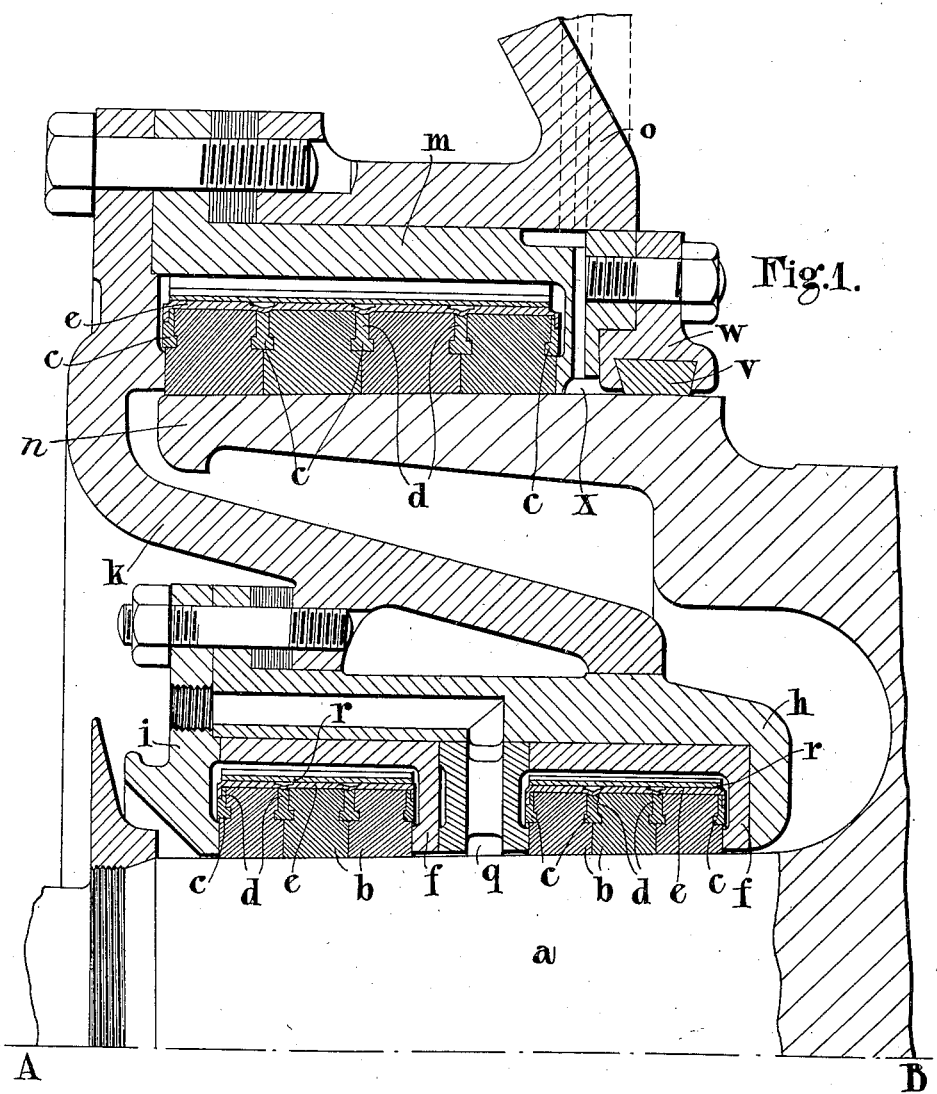

S. Z. DE FERRANTI.
PACKING FOR SHAFTS AND THE LIKE.
APPLICATION FILED FEB. 23, 1911.

1,033,237.

Patented July 23, 1912.

3 SHEETS—SHEET 1.

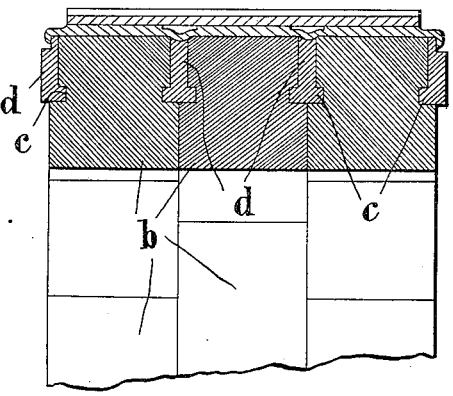
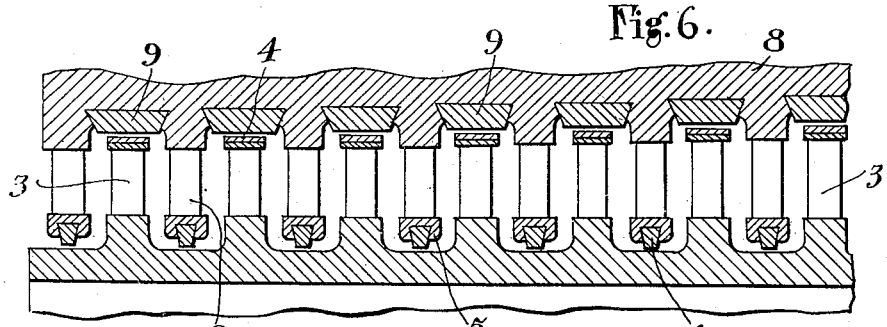
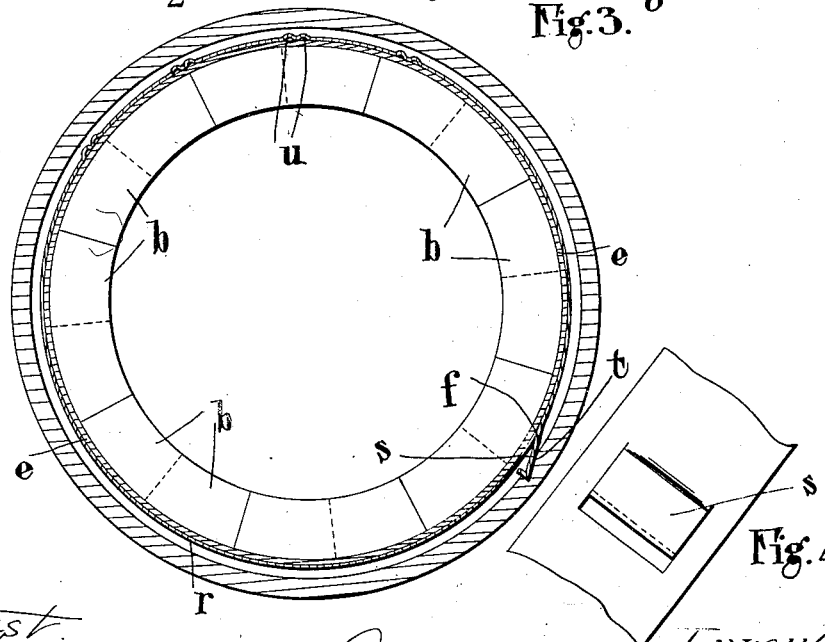

UNITED STATES PATENT OFFICE.

SEBASTIAN ZIANI DE FERRANTI, OF GRINDLEFORD BRIDGE, ENGLAND.

PACKING FOR SHAFTS AND THE LIKE.

1,033,237. Specification of Letters Patent. Patented July 23, 1912.

Application filed February 23, 1911. Serial No. 610,332.

*To all whom it may concern:*

Be it known that I, SEBASTIAN ZIANI DE FERRANTI, a subject of the King of Great Britain and Ireland, and residing at Grindleford Bridge, in the county of Derby, England, have invented certain new and useful Improvements in and Relating to Packings for Shafts and the Like and Certain Applications Thereof, of which the following is a specification.

The invention relates to packings for shafts, spindles or other rotatable bodies and is specially suitable for use in conjunction with turbines and turbo-compressors.

In my U. S. patent specification No. 930,848, I have described a form of bearing applied to spinning machines, in which bearing a film of air between accurately machined co-acting surfaces serves as the lubricating agent. In the course of experiments devised to apply such bearings as packings to prevent escape of fluid along a shaft, it has been found that when steel runs on steel under the conditions existing in an engine house, for example, particles of grit are apt to enter unless special precautions are taken and thereby cause the packing to work badly or even break down entirely. To overcome this difficulty experiments were made with rings of other material surrounding the shaft but further difficulties arose owing to the different co-efficients of expansion of the materials employed.

The primary object of this part of the present invention is thus to overcome the difficulties heretofore experienced in adapting elastic fluid bearings to the purpose of shaft packings.

To these ends the first part of the invention may be summarized broadly as consisting in a packing having elastic fluid bearing clearances, the co-acting members of the packing and object packed being constructed of mutually non-abrasive materials.

The invention consists further in a packing for shafts and the like in which a ring of non-abrasive material divided into segments is disposed in operative proximity to the shaft and is mounted in a frame or cage having substantially the same co-efficient of expansion as the shaft or the like.

The invention consists more specifically in a packing as indicated in which a ring of graphite divided into segments is mounted in a frame in such a manner that expansion or contraction of the frame draws the graphite segments with it.

The invention further consists in surrounding the segmentally-divided ring or its supporting frame by a close fitting stationary ring which in the event of the bearing taking hold or becoming too tight will frictionally heat the frame and cause it to expand.

The invention above described modified somewhat to meet the different conditions may likewise be applied to the packing of or prevention of leakage past the blades of turbine motors and compressors.

As is well understood, it is necessary in order to obtain the highest efficiencies in turbo-machinery of the type to which this part of the invention applies, to reduce as far as possible the clearance between the blade ends and the parts of the stator or rotor in immediate proximity to them, this reduction being of particular importance at the high pressure end where the blade lengths are short. Many proposals have been made for effecting the object indicated, and at the same time overcoming the accompanying difficulty of preventing or minimizing damage due to accidental contact of the parts concerned, and the primary object of this part of the present invention is to secure the result sought with means that are both simple and not liable to derangement.

To these ends, the second part of the invention consists broadly in providing a packing or steadying member of non-seizing non-metallic material such as carbon, on or co-acting with fluid directing members such as a set of blades.

More specifically the second part of the invention consists in providing carbon rings on the shrouding rings of the stator blades and on the body of the stator between adjacent rings of blades, such carbon rings co-acting respectively with the body of the rotor and with the shrouding rings of the rotor blades.

The invention also consists in the novel constructions hereinafter described or indicated.

Figure 5:
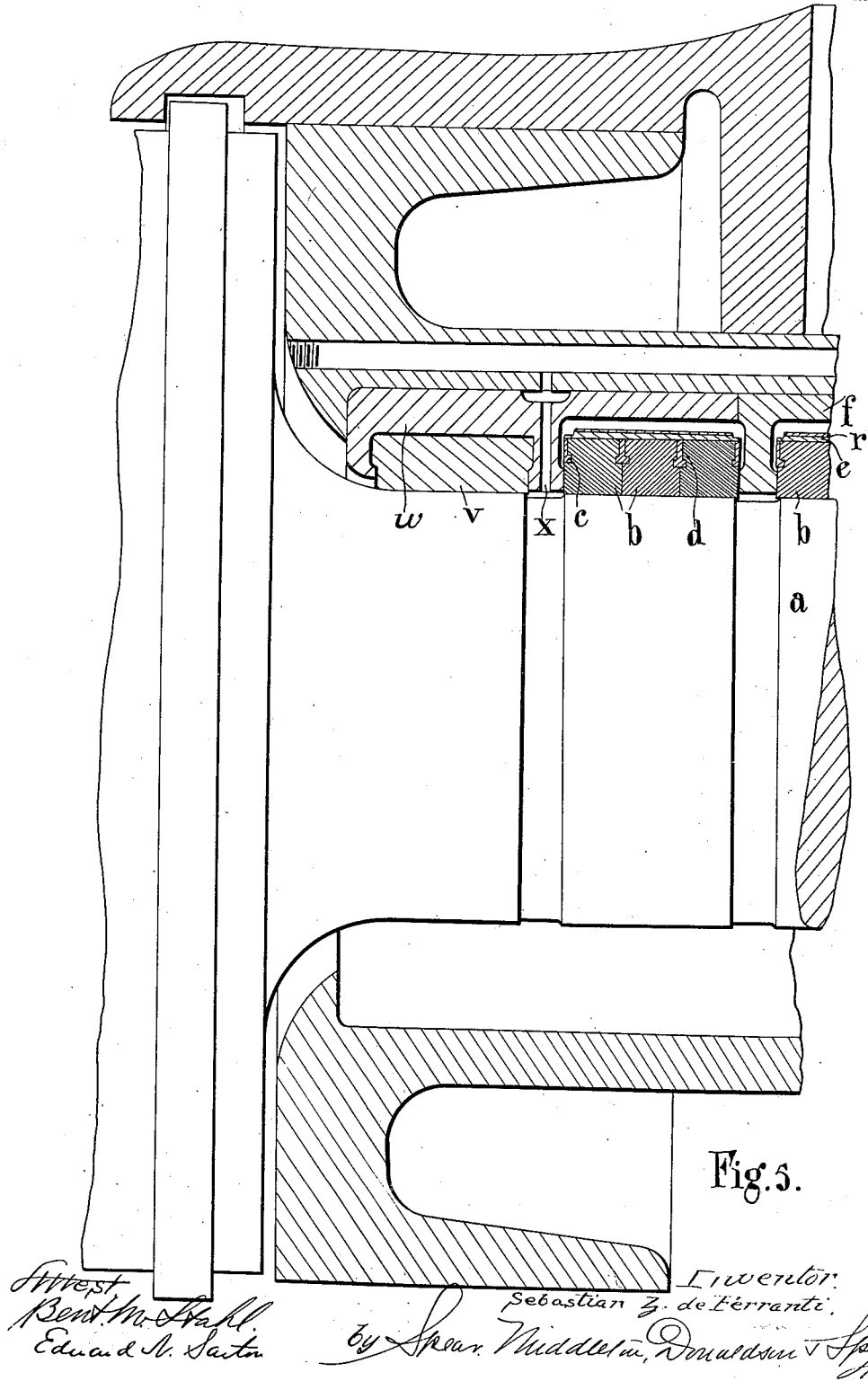

Referring to the accompanying drawings which form part of the specification: Figure 1 is a sectional elevation of part of the end of a turbine casing and shows packings for both the shaft and dummy piston in accordance with the present invention; Fig. 2 shows a view of the packing with the turbine shaft removed; Fig. 3 shows a cross-section of the packing to a smaller scale, and Fig. 4 a detail of the holding tongue or detent; Fig. 5 shows a combination of steadying and floating packing, while Fig. 6 shows a longitudinal section through the packed and steadied blades of a pressure flow turbine.

The drawings are to a certain extent of a diagrammatic nature while to avoid unnecessary duplication in Fig. 1, only those parts on one side of the center line A—B are shown.

In carrying the first part of the invention into effect according to one form as applied by way of example to a turbine shaft, $a$, subject to changes of temperature, a ring of pure graphite is built up of a number of segments, $b$, $b$, closely fitting along radial lines or planes. On each lateral face of this ring toward its larger diameter, an annular groove is turned into which fits the corresponding projecting flange, $c$, of a steel ring, $d$. In contact with the graphite ring so constructed a second similar ring is arranged, the segments of the two rings being relatively displaced as seen in Fig. 2 so as to break joint and in contact with the second ring, a third ring is arranged. The steel holding rings, $d$, between adjacent rings of graphite are flanged on each face, while a sufficient amount of the graphite is turned away to allow those parts of the faces of the graphite rings clear of the holding rings to butt against one another as shown. The holding rings themselves are held in place by a flat steel hoop, $e$, secured by burring over at the ends or in any suitable manner. In the example illustrated a pair of the compound graphite and steel rings so formed are disposed along the shaft side by side, such compound rings being held steam-tight in cast-iron rings, $f$, of L-section, within which they can adjust themselves radially, the cast iron rings fitting closely against adjacent members such as the casing or housing, $h$, which incloses them. The casing, $h$, is provided with a cover, $i$, and is secured to the larger cover, $k$, which in turn serves to hold the casing, $m$, of the packing for the dummy piston, $n$, in place in relation to the turbine casing, $o$. Clean packing steam to provide a graded pressure drop and prevent the introduction of foreign particles, may be introduced as shown through the duct, $q$. The packing should in the first instance be fitted as closely as possible to the shaft, so that the latter at first runs against considerable resistance; after a short time, however, it is found that the graphite makes its own clearance and runs with very little friction after the manner of an air bearing.

It will be seen that the steel mounting for the graphite rings will expand to the same extent as the shaft and in view of the flanges $c$ provided will draw the carbon segments radially outward and so maintain the proper clearance automatically at different temperatures.

As an addition to the device described above, a tightly fitting external ring, $r$, (see Figs. 3 and 4) may inclose the steel mounting of the graphite packing, this ring being prevented from turning by any convenient means such as the tongue or detent, $s$, separated from the body of the ring and bent outward after the manner of a hinge as shown so as to co-act with a corresponding recess, $t$, in the surrounding ring, $f$; the external ring, $r$, may also in some cases be provided with a certain number of transverse corrugations, $u$, to increase its expansibility.

The function of the external ring, $r$, is as follows:—In the event of the graphite packing becoming too tight and thus being carried around with the shaft, the steel holding ring or mounting, $e$, will make a few turns inside the stationary external ring, $r$, and in view of the close fit existing between these parts will generate heat frictionally and so expand the mounting and draw the graphite clear of the shaft.

In some cases, the packing may be so arranged that very little radial movement is possible, in which case the double function is served of packing and steadying the shaft against whipping or flexure. Thus in Fig. 5, the carbon segments, $v$, are shown mounted in a holder, $w$, which in turn fits closely in the turbine casing, the device thus acting effectively to steady the shaft; a steam inlet is indicated at $x$. The floating carbon rings shown in Fig. 1 are indicated as before by the letter, $b$.

The blade packing described hereinafter may also be used as a steadier in conjunction with the segments $b$; or in the case of a multicellular turbine, one or more rings of the steadying packing may be combined with one or more rings of the floating type to steady and pack the shaft where it passes from one cell to the next. Such a combination in a turbine of rigidly-supported and floating rings of packing is found to give very good results in practice, the different requirements connected with the supporting and packing of the rotating parts of the turbine being distributed among the various members as follows:—The ordinary main bearings of the turbine take the dead-weight of the rotating parts; the rigidly-supported segments act as an emergency bearing to steady any whipping of the shaft that may occur and to a certain extent as a packing also while the floating carbon rings closely fitting and guided by the shaft or the like act solely as packings to prevent leakage.

Similar composite elastic fluid bearing rings may likewise be used to form the standing element of a dummy piston or like part, such an application of the invention being shown in Fig. 1. As before the carbon packing may be mounted in the form of segments $b$, (four main courses of which are shown) in a steel frame which expands with increase of temperature and so maintains the desired clearance; a supplementary ring of steadying packing, $v$, is also shown together with a steam inlet, $x$, as before. In the class of bearing to which the present invention relates it is advisable that any steam or other fluid so introduced should be first cleaned in a centrifugal separator or otherwise.

Where the temperature to which the parts are subjected is uniform or approximately so, it is unnecessary to divide the ring into segments, a solid ring accurately turned in relation to the shaft giving good results; or the ring may be built up of segments dovetailed into one another. Or again, carbon segments may be employed with the radial joints butting, the segments being tied together by a metal band for example under considerable tension. With small temperature changes, the clearance when cold may be so proportioned as to become a fluid bearing clearance at the working temperature. Such a packing works well and with a very small degree of friction and heating, and in these respects is to be distinguished from packings built up of carbon segments pressed against the shaft or rod by the pressure of springs or fluid on their rear surfaces. Moreover, in some cases the co-acting surfaces of the packings and shaft or dummy may be made conical as indicated in Fig. 1 so that a fine adjustment of diameter may be made by appropriate means provided to give an end movement.

In some cases certain of the structures described or indicated above may be used for sliding as well as for rotating packings and may be sometimes useful in addition as described with reference to the second part of the invention, when the conditions do not allow the full advantages of the air bearing to be secured.

Any of the packings described may be reversed, $i. e.$, the packing may be disposed internally to the cylinder or the like to be packed, in which case the steel holding frame acts to expand the packing to the cylinder as the latter itself expands and thus maintain the proper clearance automatically.

A development or extension of the above forming the second part of the invention may be carried into effect according to one form as shown in Fig. 6, both the standing blades, 2, and running blades, 3, being shrouded in any suitable manner. The shrouding ring, 4, of the running blades must be finished off as smoothly as possible without leaving any sharp edges or irregularities. The shrouding ring, 5, of the standing blades, however, is specially formed for example with a dovetailed groove as shown, into which segmental strips of carbon, 6, of similar section are forced. The inner diameter of this ring is finished as accurately as possible to a diameter only very slightly in excess of that of the rotor body, 7, between adjacent rings of running blades. A similar disposition of parts is provided to prevent leakage over the ends of the running blades, in this case a groove or recess, dovetailed or not as desired being formed in the body, 8, of the stator or in a special ring. Carbon strips, 9, are in the same way as before, disposed in such recesses and are finished to a diameter very slightly greater than that of the finished surface of the shrouding rings, $c$, of the running blades. In some cases the carbon strips may if desired be attached to and rotate with the turbine rotor. The carbon segments forming the complete ring may be checked, recessed or dovetailed into one another in any suitable manner, or where rings of greater breadth are required two or more thicknesses of carbon may be used with the component segments breaking joint with one another in the manner described in an earlier part of this specification. The carbon blocks or segments, moreover, may in some cases be formed originally only roughly to the required dimensions, and cemented into place with a composition of graphite and oil or the like. In the first part of my invention above described forms of packing are described in which carbon segments are carried by a steel ring, so as to expand and contract with changes of temperature to the same degree as the shaft itself. A similar result is obtained in the present case, since the segmentally divided rings of carbon are in each case mounted in a metal holder, and can therefore freely expand and contract so that the turbine will run with a very small clearance.

I have found that pure graphite such as that manufactured in an electric furnace, has a very low co-efficient of friction when run in contact with steel, and cannot seize, so that if any deflection of the running parts occurs, the parts concerned will come into contact with the low friction surface of the carbon and will thus be steadied without any liability of damage by abrasion or the like instead of adding to the disturbance as in present constructions. Moreover, on account of the small clearances provided, any momentary displacement of the rotor is checked before the movement has reached serious dimensions.

Although good results are obtained in practice by the use of pure graphite, nevertheless in some cases, compound materials containing a graphitic substance as an essential element or even white metal may be used or any other material which does not abrade the packed member.

I wish it to be understood that although I have described particular examples of my invention in considerable detail, nevertheless the principles involved may be embodied in a variety of other structural forms.

Having now described my invention what I claim as new and desire to secure by Letters Patent is:—

1. In combination, a rotatable machine member to be packed and non-abrasive packing disposed in operative relation thereto and separated therefrom by a lubricating film of elastic fluid, the continuity of which is maintained by forces dependent on the rotation of said member.

2. In combination, a rotatable machine member to be packed and carbon packing disposed in operative relation thereto and separated therefrom by a lubricating film of elastic fluid, the continuity of which is maintained by forces dependent on the rotation of said member.

3. In combination, a machine member to be packed; a ring of segments of non-abrasive material disposed in operative relation thereto with a certain radial clearance, and a rigid holder for said segments, said holder and said segments being positively interlocked as regards radial movement.

4. In combination, a machine member to be packed; a ring of carbon segments disposed in operative relation thereto with a certain radial clearance, and a rigid holder for said segments of about the same coefficient of expansion as the member packed, said holder and said segments being positively interlocked as regards radial movement.

5. In combination, a machine member to be packed; packing in proximity to said member; a movably mounted holder for said packing and stationary friction-producing means in operative relationship to said holder.

6. In combination, a machine member to be packed; rigidly held packing steadying the same with a certain small clearance and floating packing disposed in operative relationship to said member with a lesser clearance.

7. In combination, a rigid metal holder of annular form and a plurality of packing segments of graphitic material positively locked thereto as regards radial movement.

8. In combination, a rotatable machine member to be packed; a ring of segments of graphitic material disposed in operative relationship thereto together with a metal rigid holder of annular form to which said segments are positively locked as regards radial movement.

9. In combination in a turbine, sets of stator and rotor blading; stator and rotor bodies on which said sets of blading are respectively mounted; shrouding means for the blading of one of said sets and adjacently disposed solid packings for said blading mounted on the other of said bodies.

10. In combination, a turbine rotor blade; shrouding means therefor; a turbine casing; packing of a graphitic substance carried by said casing and co-acting with said shrouding means; stator blades; a turbine rotor body and similar packing carried by said stator blades and co-acting with said rotor.

11. In combination in a turbine, sets of stator and rotor blading; stator and rotor bodies on which said sets of blading are respectively mounted; shrouding means for the blading of one of said sets and adjacently disposed solid packings of a graphitic substance for said blading mounted on the other of said bodies.

12. In combination in a turbine, sets of stator and rotor blading; stator and rotor bodies on which said sets of blading are respectively mounted; shrouding means for the blading of one of said sets and adjacently disposed solid packings for said blading positively locked to the other of said bodies.

13. In combination, a machine member to be packed, and packing therefor rotatable relatively to one another said packing being disposed in operative relation to said member and separated therefrom by a lubricating film of elastic fluid, the continuity of which is maintained by forces dependent on said relative rotation.

14. A machine member to be packed and transversely movable packing therefor rotatable relatively to one another said packing being disposed in operative relation to said member and separated therefrom by a lubricating film of elastic fluid, the continuity of which is maintained by forces dependent on said relative rotation.

15. In combination, a ring of packing segments of graphitic material having annular grooves in its lateral faces and a rigid metal holder of annular form having flanges fitting into said grooves.

16. In combination, a plurality of adjacently disposed courses of packing segments having annular grooves in their lateral faces; intervening rings having flanges fitting into said grooves and means for clamping said segments and intervening rings together.

17. In combination, a rotatable machine member to be packed, and packing therefor, the operative surfaces of said member and packing being slightly coned, and means for causing a relative axial movement between said member and said packing to adjust the working clearance.

In testimony whereof I have signed my name to this specification in the presence of two subscribing witnesses.

SEBASTIAN ZIANI DE FERRANTI.

Witnesses:
 LOUIS FRED NOMI,
 WILLIAM DUNCAN DAVIDSON.